(No Model.)

J. D. PERRY.
TEA KETTLE COVER.

No. 394,392. Patented Dec. 11, 1888.

Witnesses:
P. M. Hulbert.

Inventor:
Judson D. Perry.
By Thos. S. Sprague & Son
Att'y.

UNITED STATES PATENT OFFICE.

JUDSON D. PERRY, OF DETROIT, MICHIGAN.

TEA-KETTLE COVER.

SPECIFICATION forming part of Letters Patent No. 394,392, dated December 11, 1888.

Application filed November 12, 1887. Serial No. 254,969. (No model.) Patented in Canada November 23, 1887, No. 28,058.

*To all whom it may concern:*

Be it known that I, JUDSON D. PERRY, a citizen of the United States, residing at Detroit, in the county of Wayne and State of Michigan, have invented certain new and useful Improvements in Tea-Kettle Covers, (for which I have obtained Letters Patent in Canada, November 23, 1887, No. 28,058,) of which the following is a specification, reference being had therein to the accompanying drawings.

This invention relates to certain new and useful improvements in tea-kettle covers.

The object of the invention is to construct a cover for kettles and other like vessels that are employed for boiling water, in the use of which the liability of escaping steam burning the hands is entirely avoided, and to provide a means for filling the kettle or vessel without removing the cover.

To this end the invention consists in the peculiar construction and combination of the parts constituting my improved cover, all as more fully hereinafter set forth.

Figure 1:
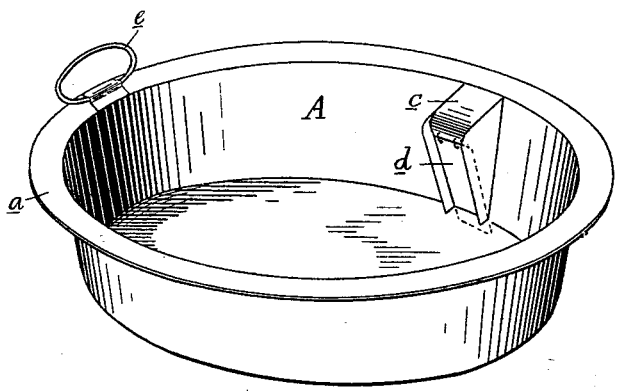
Figure 2:
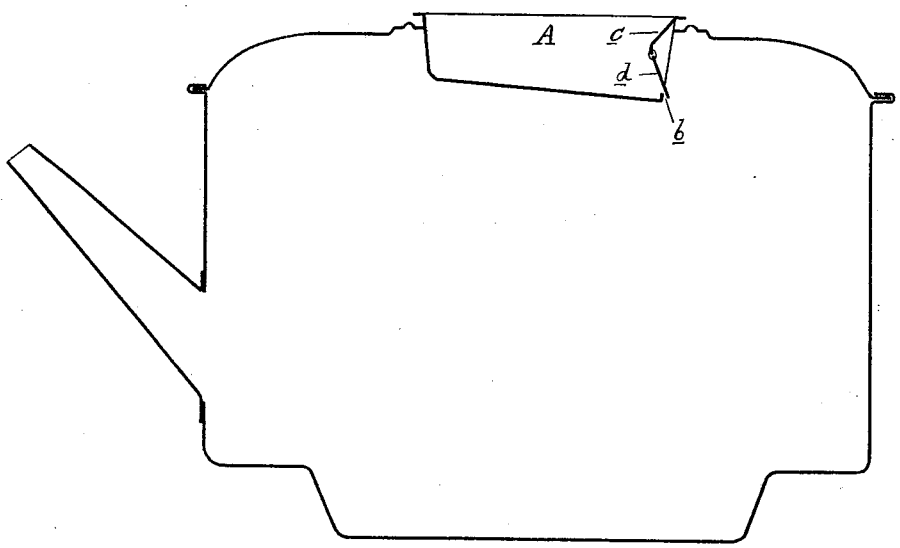
Figure 3:
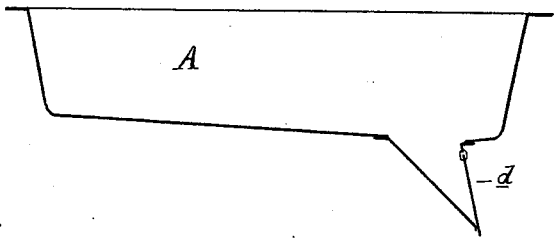

Figure 1 is a perspective view of my improved device. Fig. 2 is a central vertical section of the same. Fig. 3 is a central vertical section of the cup of slightly-modified form.

In the accompanying drawings, which form a part of this specification, A represents a shallow cup or vessel, the upper edge of which is provided with a flange, $a$. The bottom of this cup or vessel I preferably form upon a slight incline, as shown, and in the wall of the cup, immediately above the lowest point of its bottom, I form an opening, $b$. At the top of this opening is secured to the inner wall of the cup the offset $c$, and to the inner edge of this offset is pivotally secured, in any suitable manner, the gravity-valve $d$.

In practice the cup is inserted in the opening in the top of the kettle or vessel, and is designed to fit closely therein. In filling the vessel it is not necessary to remove the cup, but water is poured into the latter, which finds an exit into the kettle by passing below the valve.

It will be readily seen that in the use of a device of this character in place of the ordinary cover the liability of burning or scalding the hands when in the act of pouring into the kettle is entirely avoided, particularly if the cup is properly inserted in the mouth of the vessel with its discharge toward the diametrically-opposite side of the vessel from the nozzle, as when in this position the gravity of the valve will keep it closed against the egress of steam at that point, and the annoyance of having the cover accidentally fall off is also avoided, as the cup is designed to fit sufficiently close to prevent its accidental displacement. If desired, the cup may be provided with a handle, $e$, as shown, to facilitate its ready removal.

While I have shown and described the valve as located within the cup, I do not desire to confine myself to such construction, as it is evident that the discharge from the cup may be located in the bottom, as is shown in Fig. 3, which is a modification of the construction described above.

I am aware that it has been proposed to provide a kettle-cover with a valve having a projection or weight on one side acting as a counter-balance to the valve for the purpose of closing the same; but so far as I am aware no kettle-cover has ever been provided with a valve so arranged as to be closed by the weight of the valve itself. To accomplish this I so arrange the valve that the acting part of the same shall fall against the wall of the passage it closes. By "fall" I mean any motion, whether vibrating or otherwise, whether sidewise or perpendicular, so long as the valve closes against its seat by a downward movement of the acting part thereof, or, in other words, where the valve has to be moved upward to allow the liquid to pass. The amount of such "upward" motion is immaterial, so long as it is sufficient to enable the valve to close without a counter-balance.

What I claim as my invention is—

1. As an improved article of manufacture, a cover for kettles or other vessels, the same consisting of a cup having inclined bottom and discharge-opening near its bottom, and a gravity-valve hinged to one side of said opening above the point of contact between the valve and the walls of said opening, substantially as described.

2. A cover for tea-kettles and other vessels, consisting of a cup, A, having a flange, $a$, and provided with an inclined bottom, and a discharge-opening near its bottom, an offset, $c$, above said opening, and a gravity-valve pivoted to said offset, substantially as and for the purpose specified.

In testimony whereof I affix my signature, in presence of two witnesses, this 5th day of October, 1887.

JUDSON D. PERRY.

Witnesses:
H. S. SPRAGUE,
P. M. HULBERT.